Aug. 7, 1923.
W. T. CARTER
MICROSCOPE ATTACHMENT
Filed July 6, 1920
1,463,938
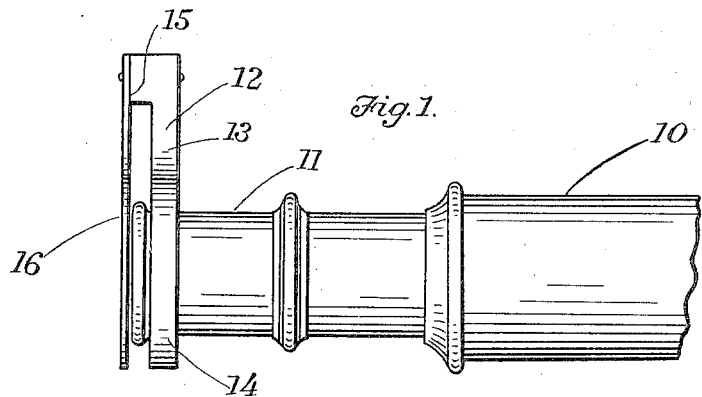
Fig. 1.
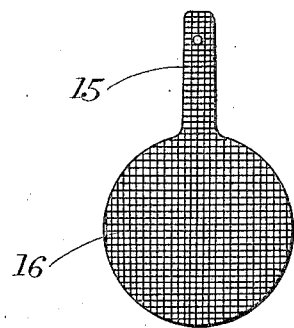
Fig. 2.
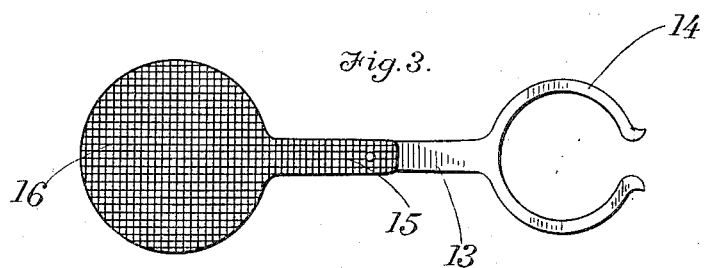
Fig. 3.
Inventor
Wm T. Carter
By
Attorneys Patented Aug. 7, 1923.

1,463,938

UNITED STATES PATENT OFFICE.

WILLIAM T. CARTER, OF HOT SPRINGS, ARKANSAS.

MICROSCOPE ATTACHMENT.

Application filed July 6, 1920. Serial No. 394,173.

*To all whom it may concern:*

Be it known that I, WILLIAM T. CARTER, a citizen of the United States, residing at Hot Springs, in the county of Garland, State of Arkansas, have invented certain new and useful Improvements in Microscope Attachments; and I do hereby declare the following to be a full, clear, and exact description of the invention, such as will enable others skilled in the art to which it appertains to make and use the same.

This invention relates to new and useful improvements in attachments for microscopes.

One object of the present invention is to provide a novel and improved attachment for the eye-piece of a microscope which will protect the said eye-piece from dust or injury while not in use.

Another object is to provide a novel and improved device for attachment to the drawtube of a microscope which will permit one eye to see through the eye-piece, while at the same time the other eye is prevented from seeing, thereby relieving the unused eye from strain.

Another object is to provide a novel and improved device of the character named which is readily adjustable to obscure the vision of either eye of the user of the microscope.

Other objects and advantages will be apparent from the following description when taken in connection with the accompanying drawing.

In the drawing:

Figure 1 is an elevation of the eye-piece of a microscope which has the invention applied thereto, the invention being in position to protect the eye-piece from dust and injury.

Figure 2 is a top plan view of the same.

Figure 3 is a top plan view of the parts shown in Figure 1, but with the shield disk swung to one side to obscure the vision of the eye which is not being used to see through the microscope.

Referring particularly to the accompanying drawing, 10 represents a portion of the main tube of a microscope and 11 the adjustable focusing tube telescoped within the main tube and having the eye-piece 12 on its upper end.

The attachment comprises a stem 13, formed of any suitable material such as metal, celluloid, hard rubber, or the like, and having formed on one end the opposite outwardly bowed arms 14. Pivotally mounted for swinging movement on the other end of the stem, is a stem 15 which has a circular disk 16 formed on its outer end. The upper face of the disk, as well as the stem 15, is blackened.

In applying the device to the microscope, the bowed arms 14 are pressed against the extreme upper end of the drawtube, said arms spreading by pressure until they encircle the drawtube. This position will place the arms directly beneath the eye-piece so that the pivoted stem 15 may be swung in a direction transversely of the upper end of the eye-piece, to dispose the disk 16 directly over the eye-piece, for the purpose of protecting the eye-piece from dust and other foreign matter settling on the lens in the eye-piece. When the device is to be used, or when the person desires to look into the microscope, the disk is swung to one side or the other of the eye-piece, thus permitting the person to place one eye at the eye-piece. The other or unused eye directs its vision against the blackened face of the disk, said disk being in such position that it is directly in front of the unused eye, and the strain incident to the unused eye seeing objects at the side of the microscope, while the used eye sees the objective on the slide of the microscope, is completely obviated. It will be readily seen that no matter which eye the person uses to see into the microscope, the disk may be swung, together with the stem 13 and bowed arms 14, to either side of the eye-piece to obscure the vision of the unused eye.

What is claimed is:

As an article of manufacture, a microscope attachment comprising a stem having a resilient split ring at one end lying in the plane of the stem and a boss rising from the plane of the stem at the other end thereof, and a disk having a stem pivotally mounted at one end on the boss and movable in a plane parallel to and transversely of the first stem and to the ring.

In testimony whereof, I affix my signature, in the presence of two witnesses.

WILLIAM T. CARTER.

Witnesses:
ARTHUR COBB,
C. FLOYD HUFF.